United States Patent [19]

Woollenweber

[11] Patent Number: 4,565,505
[45] Date of Patent: Jan. 21, 1986

[54] COMBINATION FLOW TURBINE FOR INTERNAL COMBUSTION ENGINE TURBOCHARGERS

[76] Inventor: William E. Woollenweber, 3905 Cove Rd., Columbus, Ind. 47203

[21] Appl. No.: 483,600

[22] Filed: Apr. 11, 1983

[51] Int. Cl.$^4$ .................... F04B 17/00; F04B 35/00
[52] U.S. Cl. .................................. 417/407; 417/409
[58] Field of Search .............. 417/407, 408, 409; 415/DIG. 3; 60/39.08

[56] References Cited

U.S. PATENT DOCUMENTS

| | | | |
|---|---|---|---|
| 3,043,636 | 7/1962 | MacInnes et al. | 308/121 |
| 3,056,634 | 10/1962 | Woollenweber, Jr. et al. | 308/78 |
| 3,096,126 | 7/1963 | Woollenweber, Jr. et al. | 308/9 |
| 3,218,029 | 11/1965 | Woollenweber, Jr. | 253/55 |
| 3,303,994 | 2/1967 | Morooka | 417/407 |
| 3,390,926 | 7/1968 | Woollenweber, Jr. | 308/122 |
| 3,423,926 | 1/1969 | Nancarrow et al. | 60/13 |
| 3,614,259 | 10/1971 | Neff | 415/205 |
| 3,734,650 | 5/1973 | Reisacher et al. | 417/407 |
| 3,811,741 | 5/1974 | McInerney | 308/122 |
| 3,930,747 | 1/1976 | Woollenweber | 415/205 |
| 3,993,370 | 11/1976 | Woollenweber | 308/121 |
| 4,107,927 | 8/1978 | Gordon et al. | 417/407 |
| 4,209,207 | 6/1980 | Schippers et al. | 417/407 |
| 4,256,441 | 3/1981 | Arora | 417/407 |
| 4,364,717 | 12/1982 | Schippers et al. | 417/407 |
| 4,367,626 | 1/1983 | Schwartzman | 417/407 |
| 4,370,106 | 1/1983 | Lauterbach | 417/407 |

OTHER PUBLICATIONS

Diesel & Turbine Worldwide Catalog-1980, vol. 45, pp. 1153–1155.

Primary Examiner—Carlton R. Croyle
Assistant Examiner—Timothy S. Thorpe
Attorney, Agent, or Firm—Willian, Brinks, Olds, Hofer, Gilson & Lione

[57] ABSTRACT

A new turbine combining the advantage of a combination-flow turbine wheel which may be inserted and removed from the turbocharger assembly through the exhaust opening, and a divided volute turbine casing, wherein the dividing wall is canted away from the exhaust opening allowing the gases from the volute passages to flow through the turbine with less flow losses than in conventional, radial turbines.

10 Claims, 2 Drawing Figures

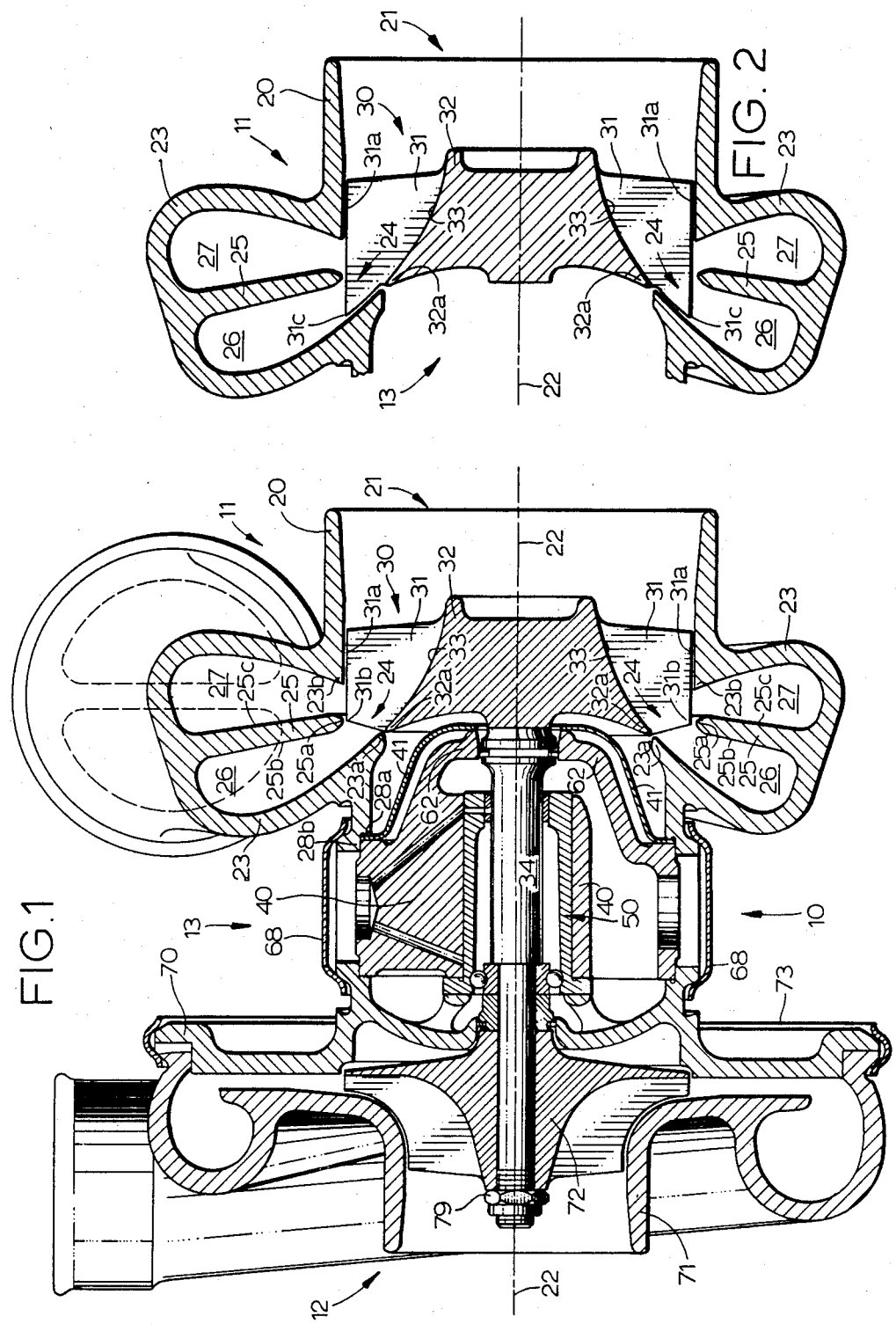

COMBINATION FLOW TURBINE FOR INTERNAL COMBUSTION ENGINE TURBOCHARGERS

BACKGROUND OF THE INVENTION

This invention relates to a turbine for internal combustion engine turbochargers and, more particularly, to a turbine which operates with greater efficiency and reliability and one which may be more easily manufactured and maintained.

Turbochargers for diesel and gasoline engines are well known. Such turbochargers are being manufactured and sold by such companies as Airesearch Industrial Division of Garrett Corp., Schwitzer Division of Wallace Murray Corp., Cummins Engine Co., and others. The commercially available small turbochargers generally use radial inflow turbines with the driving engine exhaust gas being directed into the turbine from vaneless volute turbine casings surrounding the small radially vaned turbine wheels of the turbines.

Such radial turbines have used open back wheels where the radial vanes of the turbine wheel extend beyond the central hub portion of the wheel outwardly and are unsupported between one another for a portion of their outer radial length. Turbine wheels of this type are typically known as open back wheels or star wheels. The omission of material to form the open back portion of the star wheel of such commercial radial turbines has been to reduce the rotational inertia of the turbine wheel and improve the transient response of the turbocharger to changes in the exhaust energy level of the internal combustion engine. Commercial radial turbines employing open back (star) turbine wheels have included the use of a stationary wall located in close proximity to the back of the rotating turbine wheel to prevent excessive gas leakage around the back of the turbine vanes. The backing member, like the turbine wheels, is exposed to the high exhaust gas temperatures of the internal combustion engine and must be made from heat-resistant material to avoid excessive distortion that may cause it to contact the rotating turbine wheel. The close tolerances needed to make such radial inflow turbines effective and the materials and manufacturing processes necessary to obtain an effective turbine operation make such turbines expensive to manufacture.

In currently available turbochargers, the turbine blades are contoured at their outer extremities to match the contours of the turbine casing defining the turbine inlet and exit opening and exhaust passage. Generally in such turbines, the turbine blades (or vanes) extend outwardly from the central core or hub into the turbine casing portion defining the exhaust gas outlet-turbine inlet portion of the turbocharger. Where the hub diameters of the turbine blades have a small diameter, the turbine blades must be thickened at their base to withstand centrifugal force and only a small number of blades can be used, lowering the efficiency of the resulting turbine.

The radial inflow turbines of prior turbochargers have deflected the exhaust gases through 90° or more in their flow between the turbine inlet and turbine outlet. Examples of such turbines are shown at page 1154 of the 1980 Diesel and Gas Turbine Worldwide Catalog published by Diesel and Gas Turbine Progress, P.O. Box 26308, Milwaukee, Wisconsin 53226.

As shown in the catalog, the "volute" portion of the turbine casing, which directs the exhaust gas from the internal combustion engine into the turbine inlet, frequently includes a meridional or central divider to direct the pulsating flow of exhaust gas from one set of cylinders of an internal combustion engine into one volute chamber and the pulsating flow of exhaust gas from another set of cylinders into the other volute chamber. The central divider of the volute maintains separation of the two pulsating flows to prevent the effect of pulsations from one set of cylinders from deleteriously affecting the flow of exhaust gas and the performance of the other set of cylinders. Such divided turbine casings are particularly desirable in V-type engines in which the flow of exhaust gas from one bank of cylinders is supplied to one part of the divided turbine casing and a flow of exhaust gas from the other bank of cylinders is supplied to the other part of the turbine casing. Such twin-flow turbine casings are shown and described in U.S. Pat. No. 3,614,259.

Commercial engines have also used turbine casings in which exhaust gas flow from two different groups of cylinders in an internal combustion engine, as for example, the two banks of a V-type engine, were carried to the turbine of a turbocharger in two separated flow paths which terminated prior to or at the start of the volute section of the casing. U.S. Pat. No. 3,930,747 describes a turbine housing of this type, which has the added advantage of being designed so that each portion of the divided manifold aspirates gas from the other portion as a result of the higher flow resulting from the pulsations, thus reducing the engine cylinder back pressure within the exhaust system.

Prior commercial turbochargers are exemplified by U.S. Pat. Nos. 3,292,092; 3,292,364; 3,270,495; 3,614,259; 3,930,747; 3,218,029; 3,408,046; and 3,423,926.

SUMMARY OF THE INVENTION

This invention combines the advantages of a combination flow turbine wheel which may be inserted and removed from the turbocharger assembly through the exhaust opening of the turbine casing, and a divided volute turbine casing designed in a unique way so that the tips of the turbine blades can be extended to be closely adjacent to the turbine casing divider wall without complicating the mechanical design of the turbine, thereby providing an economical assembly with high-turbine efficiency compared with conventional, radial turbines used in turbochargers.

In the turbocharger of this invention, the turbine wheel may be placed in position adjacent the exhaust gas outlet of the turbine casing through the exhaust opening of the turbine casing volute, generally along its axis of rotation. The exhaust gas outlet of the turbine casing and the turbine wheel coact to provide a combination flow turbine, directing exhaust gas from the outlet opening in the turbine casing volute into the turbine wheel partially from its rear some of which enters the wheel at less than the maximum diameter of the blades and flows nearly axially through the turbine blade passages. The portion of the turbine casing forming the volute passageway or passageways adjacent the turbine inlet is generally canted toward the compressor of the turbocharger. A major portion of the turbine casing lies generally on the compressor side of a plane normal to the axis of rotation passing through the rearmost part of the turbine. A substantial portion of the exhaust gases enter the turbine wheel and are directed at the exhaust opening of the turbine at angles less than normal to the axis of rotation, which is generally referred to as less than 90°.

In the turbine of this invention where the turbine casing forms two volute passageways for the exhaust gas, one volute portion lies generally on the compressor side of a plane normal to the axis of rotation, passing through the rearmost point of the turbine inlet opening; and the other volute portion lies generally on the compressor side of a plane normal to the axis of rotation, passing through the forwardmost part of the turbine inlet opening. In such turbochargers, the meridional or central divider of the turbine casing which forms the two volute exhaust gas passageways lies generally on the compressor side of a plane normal to the axis of rotation, passing through that portion of the turbine wheel closest to the compressor; and both side surfaces of the central divider form acute included angles with respect to the axis of rotation of the turbine and direct exhaust gas generally toward the exhaust opening.

These and other features of this invention are shown and more particularly described with respect to the following drawings in which:

BRIEF DESCRIPTION OF THE DRAWINGS

FIG. 1 is a cross-sectional view of a turbocharger incorporating the turbine of this invention taken along the central plane through its axis of rotation;

FIG. 2 is a partial cross-sectional view taken along the central plane through the axis of rotation of the turbine end showing another embodiment of the invention.

DETAILED DESCRIPTION OF THE PREFERRED EMBODIMENTS

Turning now to FIG. 1, a turbocharger 10 incorporating the turbine of this invention includes generally a means 11 defining a turbine at one end, a means 12 defining a compressor at the other end and a means 13 therebetween to support the rotating shaft between the turbine and compressor and its bearing system.

The means defining the turbine includes a turbine casing 20 and a turbine wheel 30 having a plurality of blades 31 extending outwardly from a central core or hub 32. As shown in FIG. 1, the turbine wheel has a maximum diameter that permits the tips 31a of turbine blades 31 to pass through the exhaust opening 21 of the turbine casing and along its central axis 22, which is generally the intended axis of rotation of the rotating parts of turbocharger 10.

As shown in FIG. 1, turbine casing 20 forms a volute portion 23 that extends around the periphery of the turbine wheel 30 and forms the exhaust outlet-turbine inlet opening 24. In the embodiment shown in FIG. 1, the volute portion 23 of the turbine casing 20 includes a meridional or central divider 25 forming two volute passageways 26 and 27 that extend around the periphery and direct their respective gas outlets into the turbine through turbine inlet opening 24. The turbine inlet opening 24 is defined by turbine casing portion 23a at the rear of the turbine and casing portion 23b defining the forwardmost edge of the turbine inlet opening. Where in the description, I use the term "rearwardly" in describing the turbine means 11, I refer generally to parts of the turbine means 11 lying closest to the compressor means 12; and when I use the word "forwardly" in describing the turbine means 11, I mean those portions of the turbine means 11 lying more in the direction of the turbine exhaust opening 21.

As shown in FIG. 1, the turbine casing portion 23 forming the volute leading to the turbine inlet opening 24 lies generally rearwardly of a plane through the rearwardmost portion 32a of the turbine wheel which is perpendicular to its general axis of rotation 22. In the centrally divided turbine casing shown in FIG. 1, volute passageway 26 and the central divider 25 lie substantially rearwardly of the plane in which the rearmost points 32a of turbine 30 rotate. Volute passage 27 lies substantially rearwardly of the forwardmost point 23b of the turbine inlet opening 24.

The outer surface 33 of the central core 32 of turbine 30 is formed in such a manner that lines lying generally along its axis of rotation 22 and tangent to surface 33 over substantially its entire axial extent lie at acute included angles generally less than about 50°, with respect to its axis of rotation 22. As shown in FIGS. 1 and 2, the included angle adjacent the turbine inlet 32a is about 45° and decreases substantially in the direction of the turbine exhaust outlet 21.

In the embodiment shown, the tips of the turbine blades 31a extend rearwardly to form portions 31b that lie closely adjacent the innermost termination 25a of the central divider 25 of volute portion 23. The rearwardmost inside surface of the volute portion 23 of the casing 20 adjacent the turbine inlet 24, i.e., at 23a, will direct exhaust gas leaving the volute passageway 26 in a direction generally parallel to (i.e. tangent to) the outer surface 33 of central core 32 of the turbine wheel at its rearward end, i.e., adjacent 32a. The inside surface 25b forming volute passageway 26 lies at such an angle with respect to the outer surface 33 of the central core 32 of the turbine and to its axis of rotation 22 that it directs exhaust gas at acute angles with respect to both the outer surface 33 of the central core and with respect to its axis of rotation 22. The exhaust gas is directed from volute passageway 27 generally radially with respect to the turbine wheel. The surface 25c forming volute passageway 27 generally directs exhaust gas from volute passageway 27 at an acute angle with respect to the outer surface 33 of central core 32 of turbine 30 and generally toward the exhaust opening 21. Thus in the embodiment shown in FIG. 1, substantially all of the exhaust gas leaving the volute portion 26 and some of the exhaust gas leaving the volute portion 27, of turbine casing 20 is directed at an acute angle with regard to the axis of rotation of the turbine and generally toward the exhaust opening 21 of the turbine; and thus the volute portion 23 of turbine casing 20 may be considered to be canted rearwardly of the turbine.

The features of turbocharger 10 embodied in the means forming a turbine 11 provide a combination flow turbine, that is, a turbine having axial as well as radial flow and a reduction in energy lost in deflection of the exhaust gases, and permit the ends of the turbine blades to be extended closely to a termination of any central dividing wall of the volute portion of the tubine casing to reduce communication of gases between the divided passageways; e.g., between vortical passageways 26 and 27. Thus, the turbine operates with greater efficiency by virtue of its axial flow and reduction of mixing and loss at the turbine inlet opening and the reduction of energy lost due to deflection of the exhaust gases.

As shown in FIG. 1, because of its design and the arrangement of the turbine casing 20 and turbine wheel 30, no backup member is required to be located closely adjacent the rear of the turbine wheel 30.

As indicated above, the turbocharger 10 of FIG. 1 includes, in addition to means 11 defining a turbine, a means 12 defining a compressor, and a means 13 to support the rotating shaft 34 between the turbine and the compressor. The means 13 includes a bearing system 50 for supporting the high-speed rotating shaft 34 and the bearing housing 40 for protecting the bearing system from the heat of the turbine means 11. Seating surfaces 28a and 28b are provided on the turbine casing for seating and location of bearing housing 40 with respect to the axis of rotation 22 of the rotating system of the turbocharger. A heat shield 41 is located by surfaces 28a and 28b for further isolating the bearing system from the turbine means 11.

The means 12 forming a compressor comprises essentially three or four major parts: the first compressor housing portion 70, a second compressor housing portion 71, the compressor blower or wheel 72 and the peripheral fastener 73 engaging and holding together the first and second compressor housing portions. The first compressor housing portion 70 includes surfaces 70a and 70b adapted to seat upon the bearing housing 40 and to locate the compressor housing, i.e., portions 70 and 71, on the axis of rotation 22 of the turbocharger.

In assembly of the turbocharger shown in FIG. 1, the turbine and shaft assembly 30 and 34 may be placed on an assembly pedestal and fixture and the turbine casing 20 assembled vertically and downwardly over the turbine shaft assembly. The sheet metal heat shield 41 may be placed on surfaces 28a and 28b of turbine casing 20. The assembly sleeve may then be removed. The bearing housing 40 may then be placed vertically over the rotating shaft 34 until the bearing housing 40 is positioned on the surface 28a with the metal heat shield 41 therebetween. The bearing system 50 may then be slid over the shaft 34. The first compressor housing portion 70 may then be positioned on the bearing housing 40, and peripheral fastener 68 may be placed in position with its surfaces engaging the turbine casing 20 and first compressor housing portion 70 and may be locked in place by compression or spring-loaded clamping means (not shown) to lock the assembly in place.

The compressor wheel 72 is placed on the shaft 34, and the second compressor housing portion 71 is placed upon the first compressor housing portion 70. The peripheral fastener 73 may then be placed over the two housing portions 70 and 71 and clamped or locked into position to hold the compressor housing together.

Lock nut 79 is then attached at the end of shaft 34 to complete the turbocharger assembly.

FIG. 2 shows a partial view of another embodiment of the turbocharger in which the turbine blades terminate in a somewhat different manner. FIG. 2 shows only the means 11 forming the turbine, the remaining portion of the turbocharger being as shown in FIG. 1. In the embodiment of FIG. 2, the rearwardmost point of the tip 31c of the tip of a turbine blade extends rearwardly of the forwardmost point 23a at the rear of the volute 23 and somewhat interiorly of the volute passageway 26. Such a system tends to improve the transfer of energy from the exhaust gas in volute passageway 26 to the turbine wheel 30, but increases the moment of inertia of the turbine wheel 30 about its axis of rotation 22.

As a result of this invention, turbochargers may be more inexpensively manufactured and may operate with a greater efficiency than those of the prior art. With the invention, the contour grinding at the outer diameter of the blades of the turbine wheel is unnecessary. There are no close clearances between the turbine wheel and turbine housing. The turbine wheel and shaft assembly may be inserted into the turbine casing, or the turbine casing may be fitted over the turbine wheel through the exhaust outlet. There are no parts fitted in close proximity to the back of the turbine.

By incorporation of the combination flow turbine, the turbine casing may be reduced in diameter and the turbocharger made more compact.

While I have shown preferred embodiments, other embodiments may be devised incorporating the invention described above without departing from the spirit and scope of the following claims.

I claim:

1. In a turbine for a turbocharger for an internal combustion engine including a turbine wheel having a central core and a plurality of outwardly extending blades, said turbine wheel being rotatable about a central axis, means forming a meridionally divided volute for exhaust gas surrounding the turbine wheel and defining a turbine wheel opening permitting exhaust gas from said volute to act on the outwardly extending blades of the turbine wheel, the improvement wherein said means forming a meridionally divided volute at its turbine wheel opening includes means for directing exhaust gas from one side thereof into the turbine wheel in a direction generally axially into the turbine wheel and from the other side thereof in a direction generally radially into the turbine wheel.

2. In the turbine of claim 1, the further improvement wherein said means forming a meridionally divided volute at its turbine wheel opening includes means for directing exhaust gas from said one side of the meridionally divided volute into said turbine wheel substantially tangent to the central core of the turbine wheel.

3. In the turbine of claim 1, the further improvement wherein said means forming a meridionally divided volute at its turbine wheel opening includes means for directing exhaust gas from said one side of the meridionally divided volute into said turbine wheel at less than the maximum diameter of the turbine wheel, and from said other side of the meridionally divided volute into said turbine wheel at substantially the maximum diameter of said turbine wheel.

4. In the turbine of claim 1 wherein said turbine includes an exhaust gas outlet, the further improvement wherein said means forming a meridionally divided volute includes an outwardly extending divider wall canted in a direction away from said exhaust gas outlet and extending generally rearwardly from said turbine wheel opening, said outwardly extending divider wall having opposed side surfaces each of which form an acute angle with said central axis.

5. In the turbine of claim 1 wherein said means forming a meridionally divided volute includes a divider wall defining first and second volute passages, the further improvement wherein the tips of said outwardly extending blades extend closely adjacent to said divider wall at its innermost end for substantially limiting communication between said first and second volute passages at said turbine wheel opening.

6. In the turbine of claim 5, the further improvement wherein the extension of the turbine blade tips to closely adjacent the volute divider wall takes place at the maximum diameter of the turbine wheel.

7. In a turbine for a turbocharger for an internal combustion engine including a turbine wheel having a central core and plurality of outwardly extending blades, an exhaust gas outlet for said turbine, and a meridionally divided volute surrounding the turbine wheel forming an exhaust gas inlet for said turbine, said meridionally divided volute including a divider wall for forming said meridionally divided volute, the improvement wherein said divider wall comprises an outwardly extending wall canted in a direction away from the exhaust gas outlet and extending at its innermost end closely adjacent to the outermost tips of the turbine blades at said turbine wheel inlet.

8. In the turbine of claim 7, the further improvement wherein the exhaust gas flow from one side of the meridionally divided volute enters the turbine wheel at less than its maximum diameter and the exhaust gas flow from the other side of the meridionally divided volute enters the turbine wheel at substantially its maximum diameter.

9. In the turbine of claim 8, the further improvement wherein said exhaust gas flow from said one side of said meridionally divided volute enters the turbine wheel substantially tangent to said central core of the turbine wheel, and wherein said exhaust gas flow from said other side of said meridionally divided volute enters said turbine wheel generally radially to said turbine wheel.

10. A turbine for a turbocharger for an internal combustion engine comprising:
 a turbine wheel having a central core and a plurality of outwardly extending blades, said turbine wheel being rotatable about a central axis;
 a meridionally divided volute for exhaust gas surrounding the turbine wheel and defining a turbine wheel opening permitting exhaust gas from said volute to act on the outwardly extending blades of the turbine wheel, said meridionally divided volute including means for defining first and second volute passages having a divider wall therebetween, said means for defining said first volute passage at said turbine wheel opening directing exhaust gas into said turbine wheel at less than the maximum diameter of the turbine wheel and substantially tangent to the central core, and said means for defining said second volute passage at said turbine wheel opening directing exhaust gas into said turbine wheel generally radially inward at substantially the maximum diameter of said turbine wheel.

* * * * *